United States Patent
Myers et al.

(10) Patent No.: US 10,303,906 B1
(45) Date of Patent: May 28, 2019

(54) SMART SURFACE COVERING AND STRUCTURE HAVING REMOTELY INTERROGATABLE ANTENNA NODE ARRAY FOR REMOTE INTEGRITY CHECKING

(71) Applicant: Arm Limited, Cambridge (GB)

(72) Inventors: James Edward Myers, Bottisham (GB); David Michael Bull, Cambridge (GB); Edgar H. Callaway, Jr., Boca Raton, FL (US)

(73) Assignee: Arm Limited, Cambridge (GB)

( * ) Notice: Subject to any disclaimer, the term of this patent is extended or adjusted under 35 U.S.C. 154(b) by 24 days.

(21) Appl. No.: 15/825,467

(22) Filed: Nov. 29, 2017

(51) Int. Cl.
| | |
|---|---|
| *H04Q 5/22* | (2006.01) |
| *G06K 7/10* | (2006.01) |
| *G06K 7/00* | (2006.01) |
| *G01V 1/00* | (2006.01) |
| *G01M 5/00* | (2006.01) |

(52) U.S. Cl.
CPC ......... *G06K 7/10336* (2013.01); *G01V 1/008* (2013.01); *G06K 7/0095* (2013.01); *G01M 5/0033* (2013.01); *G06K 2007/10504* (2013.01); *G06K 2007/10534* (2013.01)

(58) Field of Classification Search
None
See application file for complete search history.

(56) References Cited

U.S. PATENT DOCUMENTS

2015/0015275 A1* 1/2015 Huang ................ G01M 5/0033
324/633

OTHER PUBLICATIONS

L. Huang et al., "A super-regenerative radio on plastic based on thin-film transistors and antennas on large flexible sheets for distributed communication links," 2013 IEEE International Solid-State Circuits Conference Digest of Technical Papers, San Francisco, CA, 2013, pp. 458-459. doi: 10.1109/ISSCC.2013.6487814.

* cited by examiner

*Primary Examiner* — Adolf Dsouza
(74) *Attorney, Agent, or Firm* — Leveque IP Law, P.C.

(57) ABSTRACT

A method, system and surface covering for enabling wireless detection of damage to a structure is disclosed. At least one array having a plurality of nodes are coupled to a surface covering, such as at least one of a wall, ceiling and floor covering for a least a portion of the structure. An electronic reader is operable to wirelessly interrogate the array and read return signals from nodes in the array. The return signals contain data representing an ID for corresponding responsive nodes in the array, and the returned IDs are extracted and compared to a plurality of IDs stored in a data store for nodes in any given array. A mismatch between the returned and stored IDs for the nodes in the array indicates a structural defect in a respective portion of the structure overlaid by the floor/wall covering.

20 Claims, 4 Drawing Sheets

SMART SURFACE COVERING AND STRUCTURE HAVING REMOTELY INTERROGATABLE ANTENNA NODE ARRAY FOR REMOTE INTEGRITY CHECKING

The present invention relates generally to verifying structural integrity after an earthquake, and more particularly, to a method, system and surface covering for wirelessly detecting cracks in a structure by interrogating a plurality of nodes in an array coupled to the covering.

BACKGROUND

Earthquakes, hurricanes and other catastrophic natural disasters can have wide-ranging negative effects and place enormous costs on humans. Man-made disasters such as industrial or gas explosions, war damage or the like, can have similar destructive effects. One of the critical problems after such disasters is structural damage assessment in affected dwellings. Determining the area, amount, and types of damage are essential to implement rescue, humanitarian and reconstruction operations in the disaster area. To this end, it is desirable to provide a remote sensing methodology and system that enables qualified personnel to quickly and remotely ascertain structural damage in a building without having to enter and physically inspect the structure.

Thus, there exists a need for a novel and efficient method, system and apparatus that enables remote detection of damage to structures after a natural or man-made disaster.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
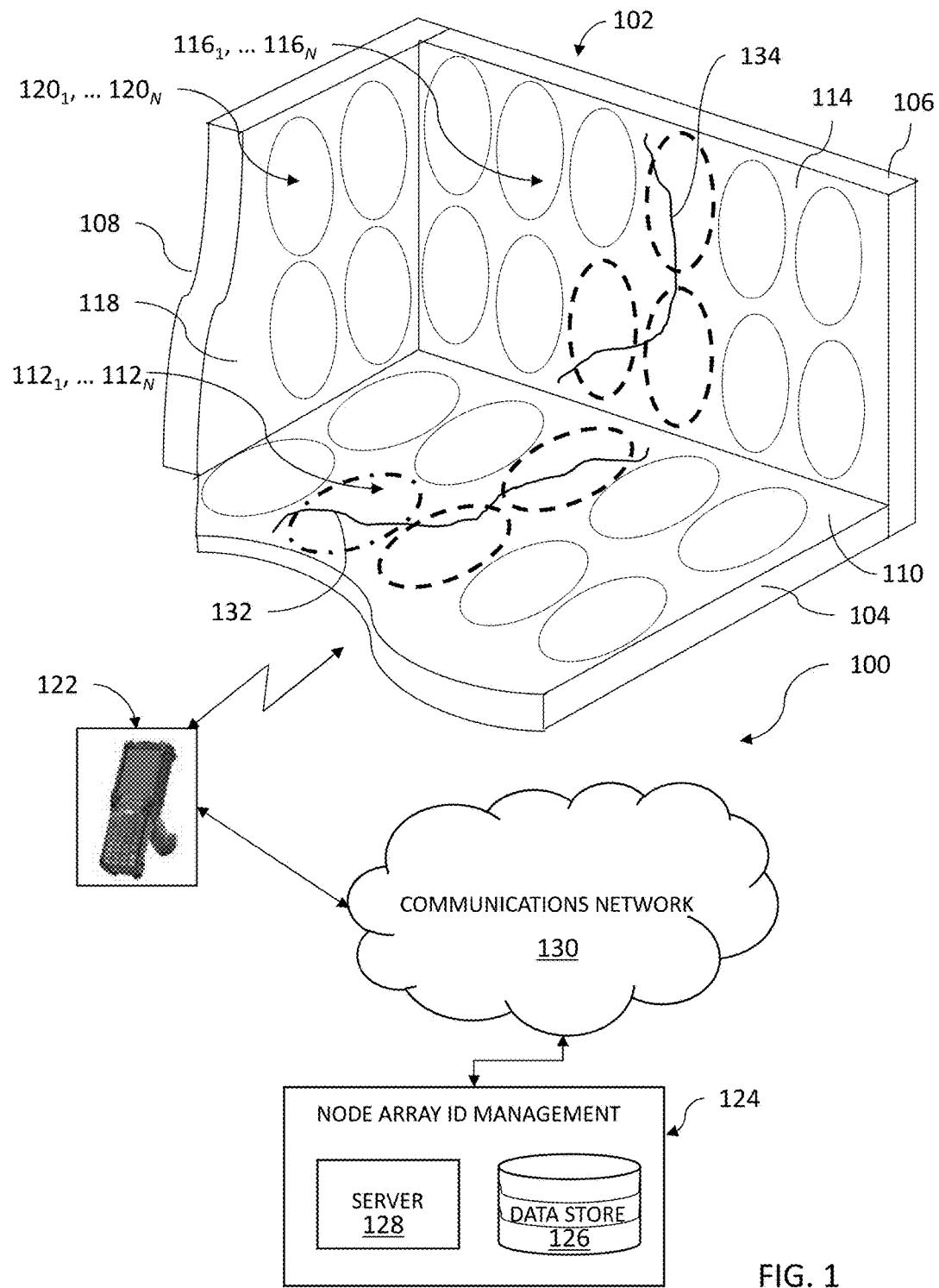
FIG. 1 is a schematic diagram of a system for wirelessly detecting structural defects in a structure in accordance with an embodiment of the present disclosure.

Specific embodiments of the disclosure will now be described in detail regarding the accompanying figures. For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

In the following detailed description of embodiments of the disclosure, numerous specific details are set forth in order to provide a more thorough understanding of the disclosure. However, it will be apparent to those skilled in the art that the disclosure may be practiced without these specific details. In other instances, well-known features have not been described in detail to avoid unnecessarily complicating the description.

It is to be understood that the terminology used herein is for the purposes of describing various embodiments in accordance with the present disclosure, and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period.

As used herein, the terms "about" or "approximately" apply to all numeric values, irrespective of whether these are explicitly indicated. Such terms generally refer to a range of numbers that one of skill in the art would consider equivalent to the recited values (i.e., having the same function or result). These terms may include numbers that are rounded to the nearest significant figure. In this document, any references to the term "longitudinal" should be understood to mean in a direction corresponding to an elongated direction of a personal computing device from one terminating end to an opposing terminating end.

In accordance with an embodiment of the present disclosure, there is provided a method of detecting defects in a structure, such as for example, a structure of a dwelling. The method consists of wirelessly interrogating, by an electronic reader, an array of nodes (e.g., loop antennas) coupled to a wall or floor covering of at least a portion of the structure. The electronic reader receives and reads return signals containing data representing IDs for corresponding responsive nodes in the array. The returned IDs are compared to a plurality of IDs stored in a data store for corresponding nodes in the array. If a mismatch is detected between the returned and stored IDs for nodes in the array, then a potential structural defect may be indicated in a respective portion of the structure.

In accordance with another embodiment of the present disclosure, the method further includes resonating the loop antennas in the array at a specified frequency in response to the interrogation. If an antenna in the array is damaged, then such antenna will resonate at a different frequency from the specified frequency, and thus fail to return its ID in response to the interrogation.

In accordance with yet another embodiment of the present disclosure, the method includes detecting a broken connection between a sequence generator and modulator in an IC coupled to a corresponding loop antenna, which causes the corresponding loop antenna to fail to return a signal containing data representative of a corresponding ID.

In accordance with still another embodiment of the present disclosure, the method includes a sequence generator transmitting a bit value indicative of no damage to a modulator in an IC coupled to a corresponding loop antenna.

In accordance with another embodiment of the present disclosure, there is provided a system for wirelessly detecting defects in a structure. The system includes at least one array having a plurality of nodes coupled to at least one of a wall, ceiling or floor covering for a least a portion of the structure, and an electronic reader that wirelessly interrogates the nodes in the array and reads return signals from the responsive nodes in the array. Each node has an ID such that the return signals contain data representing the IDs for corresponding responsive nodes in the array. The electronic reader compares the IDs in the return signals to a plurality of IDs stored in a data store for corresponding nodes in the array. If a mismatch is detected between the returned and stored IDs for nodes in the array, then a potential structural defect is indicated in a respective portion of the structure covered by the wall, ceiling or floor covering.

In accordance with yet another embodiment of the present disclosure, there is provided an electronic reader for wirelessly detecting defects in a structure. The electronic reader includes a transmitter for generating interrogation signals, a receiver for receiving return signals, and at least one processor coupled to a non-transitory memory storing computer program instructions that configure the at least one processor to cause the electronic reader to wirelessly interrogate, by the transmitter, an array of nodes coupled to a wall, ceiling or floor covering of at least a portion of the structure. The electronic reader receives return signals from the nodes, and reads data representing IDs for corresponding responsive nodes in the array. The electronic reader then extracts the IDs in the return signals and compares the IDs in the return signals to a plurality of IDs stored in a data store for corresponding nodes in the array. If a mismatch is detected between the returned and stored IDs for nodes in the array, then a potential structural defect is indicated in a respective portion of the structure covered by the wall, ceiling or floor covering.

In accordance with yet another embodiment of the present disclosure, there is provided a covering for a floor, ceiling or wall of a dwelling structure that enables remote damage detection based on the above methodology. The covering includes an array of nodes, where each node in the array is provided with an ID as described above. The nodes are configured to return signals having data representing an ID for corresponding nodes in the array in response to wireless interrogation by an electronic reader.

In accordance with yet another embodiment, the array of nodes resides on a thin-film substrate physically coupled to the wall, ceiling or floor covering. Alternatively, the array is roll-to-roll printed directly on the wall, ceiling or floor covering.

In accordance with these and additional features that will become apparent hereinafter, the present disclosure will now be described with specific reference to the accompanying drawings.

With reference now to FIG. 1, there is depicted a schematic diagram of a system 100 for wirelessly detecting damage to a structure 102 in accordance with an embodiment of the present disclosure. The structure 102 is depicted generally and, for purposes of illustration, includes a floor structure 104, wall structure 106 and wall structure 108 of a dwelling as shown. The floor structure 104 is overlaid with a floor covering 110 that contains an array of a plurality of evenly spaced nodes $112_1, \ldots, 112_N$. Similarly, wall structure 106 is overlaid with a wall covering 114 containing an array of nodes $116_1, \ldots, 116_N$, and wall structure 108 is overlaid with a wall covering 118 having an array of nodes $120_1, \ldots, 120_N$. The illustrated pattern of nodes is shown as one possible example; the nodes may be arranged in various patterns (e.g., staggered, offset, etc.) in accordance with embodiments of the present disclosure, including patterns in which nodes overlap the junction of walls, a wall and floor, and a wall and ceiling (the picture only depicts a wall and floor for clarity). Each of the nodes $112_1, \ldots, 112_N$, $116_1, \ldots, 116_N$, and $120_1, \ldots, 120_N$ may consist of a loop antenna in accordance with an embodiment of the present disclosure. The details of the antennas are described further below. A wireless reader 122 is configured to wirelessly interrogate the respective antennas in the arrays, whereupon each antenna generates a return signal that can be received and interpreted by the reader 122 as will be appreciated by those skilled in the art. Each antenna in the array is arranged to reply to the interrogation with a corresponding ID for that node in the array of nodes. In one embodiment, an ID Management System 124 includes a data store 126 for persisting IDs for each node in any given array of nodes. The data store 126 may be coupled to a server 128 for managing the IDs. Reader 122 is configured to wirelessly communicate with data store 126 over a communications network shown generally as cloud 130. In this respect, electronic reader 122 can download the IDs for each array from data store 126 over communications network 130. Alternatively, the data store 126 may be physically coupled to or part of electronic reader 122. In operation, electronic reader 122 wirelessly interrogates the at least one array of nodes $112_1, \ldots, 112_N, 116_1, \ldots, 116_N$, and $120_1, \ldots, 120_N$ and reads return signals containing data representing the ID of each operable node among $112_1, \ldots, 112_N, 116_1, \ldots, 116_N$, and $120_1, \ldots, 120_N$ in the arrays. In the example shown in FIG. 1, representative structural damage is shown conceptually as cracks 132, 134 in floor 104 and wall 106, respectively. In this regard, several of nodes $112_1, \ldots, 112_N$, $116_1, \ldots, 116_N$ overlying these cracks have been damaged and are thus inoperative. The damaged nodes here are represented by the dashed lines in the respective arrays. Accordingly, such nodes do not return any signals to reader 122. When the returned IDs are compared to a plurality of known IDs for a given array stored in the data store 124, any mismatch between the returned and stored IDs for the nodes in the array indicates a structural defect in a respective portion of the dwelling covered by the wall or floor covering having the inoperative nodes.

Figure 2A:
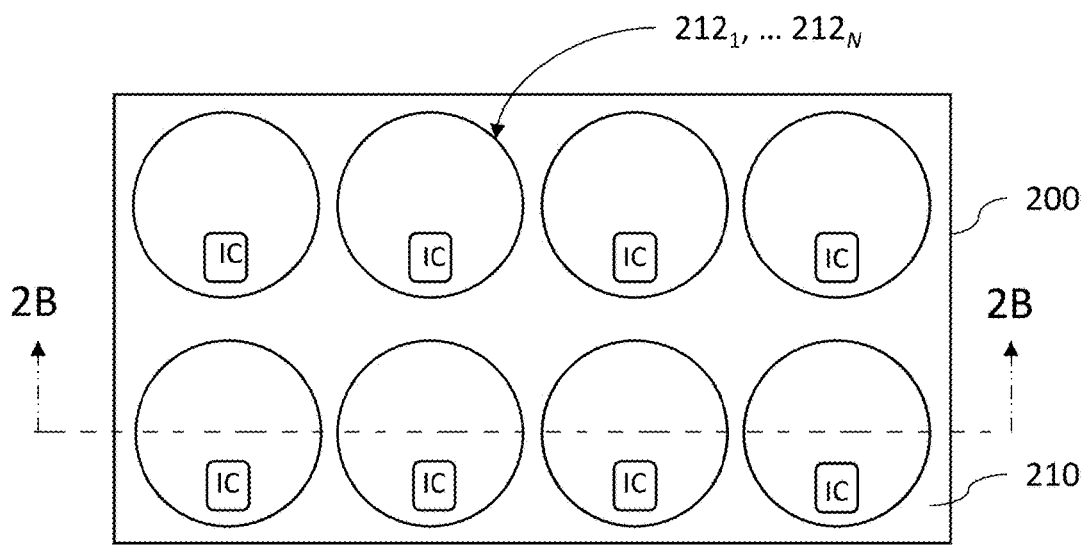
FIGS. 2A and 2B are plan view and sectional views, respectively, of a floor/wall covering having an array of a plurality of nodes in accordance with an embodiment of the present disclosure.
Figure 2B:
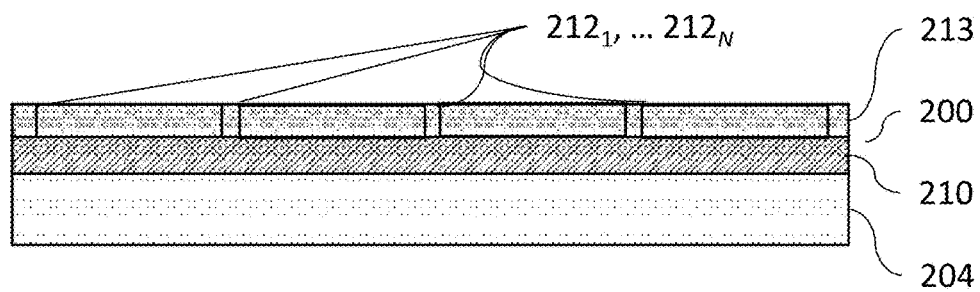

Referring now to FIGS. 2A and 2B, there are depicted a plan view and sectional view, respectively, of a floor/wall covering 200 having an array of a plurality of nodes $212_1, \ldots, 212_N$. As pictorially depicted, covering 200 is coupled (overlaid) on a floor 204 shown in phantom. As described above, the depicted configuration of nodes is one example as the nodes may be arranged in different positions relative to each other in accordance with embodiments of the present disclosure. In accordance a sample embodiment, nodes $212_1, \ldots, 212_N$ include a series of loop antennas and associated passive/backscatter radio circuits (IC) embodied in a thin film 213. The film 213 having the nodes $212_1, \ldots, 212_N$ is attached to a flexible substrate 210 (the floor or wall covering). The thin-film 213 containing nodes 212$_1$, . . . , 212$_N$ may be directly roll-to-roll printed onto the floor or wall covering 200. Alternatively, nodes 212$_1$, . . . , 212$_N$ can be roll-to-roll printed in place, or pick-and-placed from a denser sheet-to-sheet process. Such techniques for manufacturing thin-film flexible electronic circuits are well known. For wallpaper applications, the nodes 212$_1$, . . . , 212$_N$ may be screen printed directly onto the roll. Advantageously, the node arrays may be attached to surface coverings at the place of manufacture.

Figure 3:
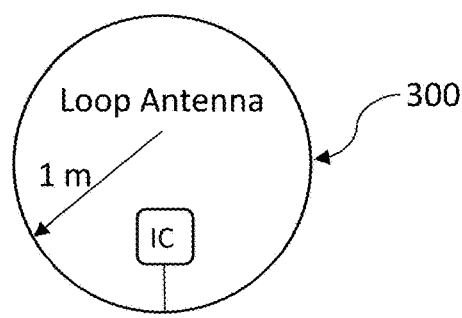
FIG. 3 is a schematic diagram of a representative loop antenna in accordance with an embodiment of the present disclosure.

Referring now to FIG. 3, there is depicted a schematic of a representative loop antenna 300 in accordance with an embodiment of the present disclosure. The loop antenna 300 may be configured with, for example, a radius of 1 m and fabricated from a conductor 1 cm in width and is adapted to operate at ISM bands 6.78 or 13.56 MHz. A loop antenna having these dimensions has an inductance of approximately 5.8 uH. Resonating this inductor at, for example, the ISM band of 6.78 MHz requires a capacitance of approximately 93 pF. It has been demonstrated that printed antennas of meter scale can achieve 12 m range at a frequency of 0.9 MHz, using 2 kb/s on/off keying (OOK). These frequencies permit good propagation through structural walls. Although shown and described herein as a loop antenna, it will be appreciated by those skilled in the art that the antenna may embodied in many different configurations, such as, for example, a power wire, and constructed and arranged in a plurality of various shapes that optimize desirable radio frequency (RF) characteristics, within the scope of the disclosure.

Figure 4:
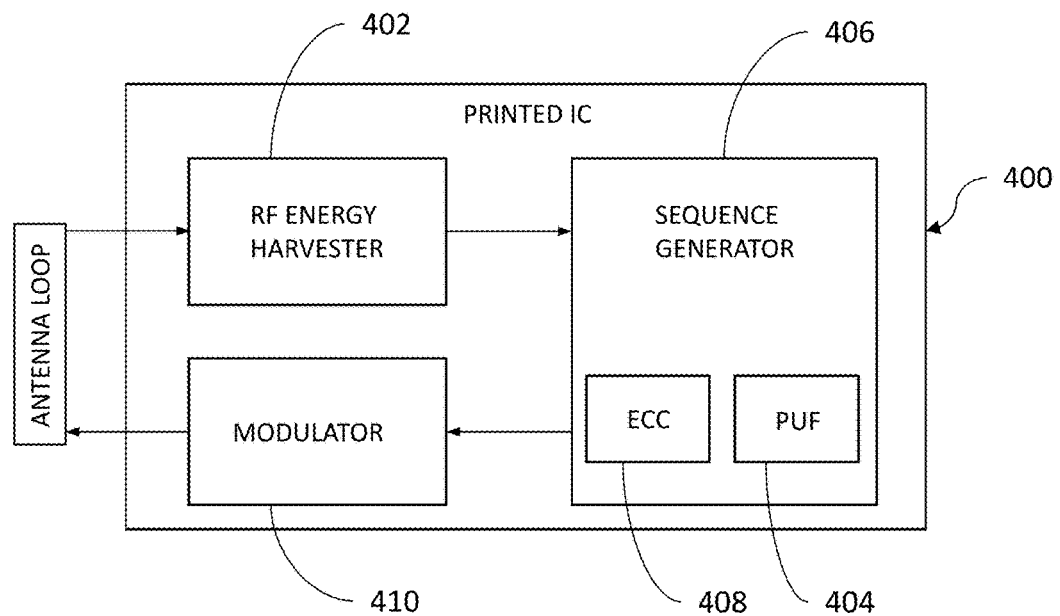
FIG. 4 is a high-level block diagram of a printed integrated circuit (IC) coupled to the loop antenna shown in FIG. 3.

Referring now to FIG. 4, there is depicted a block diagram of a printed IC 400 coupled to the loop antenna 300 shown in FIG. 3. IC 400 is a passive/backscatter circuit that receives RF interrogation signals from electronic reader 122 shown in FIG. 1. IC 400 utilizes an RF energy harvester 402 to draw energy from the RF waves into IC 400. The energy moves from the loop antenna 300 to the IC and powers the chip to generate a backscatter return signal containing an ID for each of the nodes, back to the electronic reader by modulating the impedance of loop antenna 300. The ID is generated by a hardware physically unclonable function (PUF) 404 associated with sequence generator 406. The ID length can vary in accordance with embodiments of the disclosure, but it will be appreciated by those skilled in the art that a 16 bit ID may be sufficient.

The PUF 406 is coupled to an error correcting code block (ECC) 408. The ID for the node from the sequence generator 406 is applied to modulator 410 that modulates the impedance of loop antenna 300. A return RF signal is thereby generated and transmitted by loop antenna 300 back to electronic reader 122, where the ID is extracted from the return signal and compared to a known ID for the corresponding node. As an alternative to PUF 406, a print-programmable read only memory (ROM) may be utilized in accordance with an embodiment of the present disclosure. In such an expedient, silver ink is ink-jetted on to passivation holes after manufacture/assembly. Although the configuration depicted in FIG. 4 is passive, it will be appreciated by those skilled in the art that active powered ICs may also be employed to increase detection range.

Figure 5:
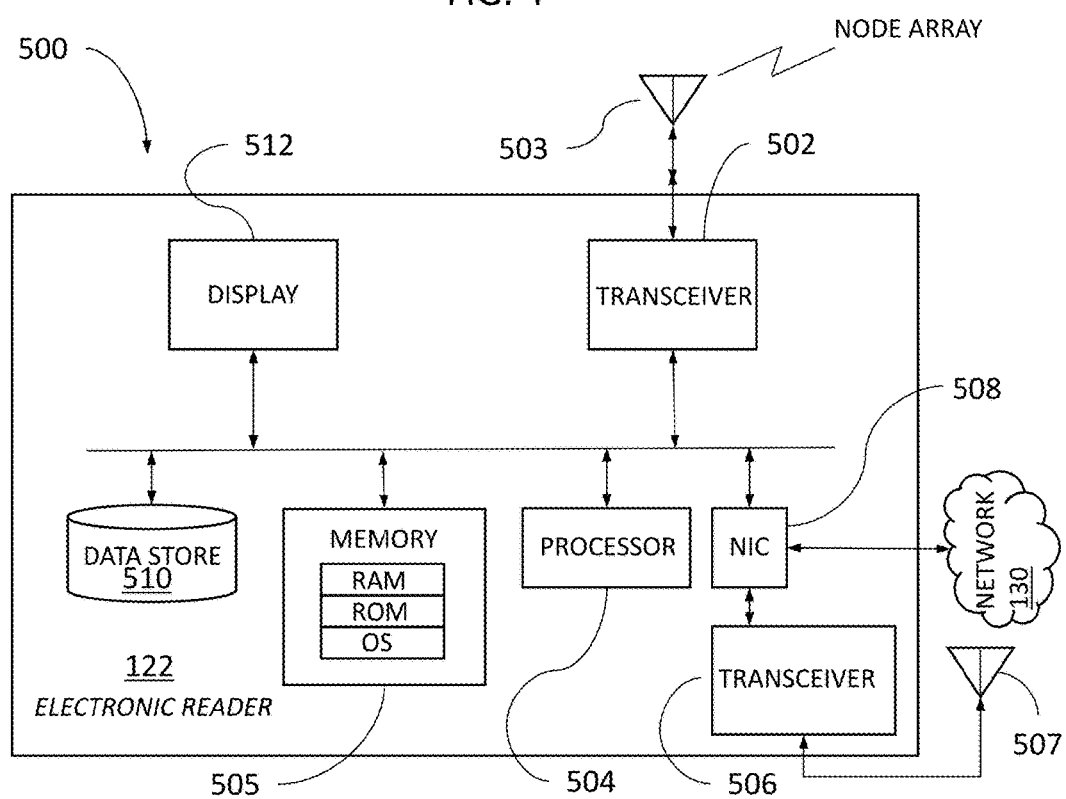
FIG. 5 is a high-level block diagram of an illustrative architecture for an electronic reader in accordance with an embodiment of the present disclosure.

Referring now to FIG. 5, there is depicted a high-level block diagram 500 of an illustrative architecture for an electronic reader 122 (FIG. 1) in accordance with an embodiment of the disclosure. The reader 122 includes transceiver circuitry 502 coupled to an antenna 503. The transceiver circuitry may include independent transmitter and receiver elements as known in the art. The reader 122 further includes at least one computer processor 504, system memory 505 including random access memory (RAM), read only memory (ROM) and an operating system stored in persistent memory, and a network interface 508 for coupling to a communications network 130 (FIG. 1). In one embodiment, a data store 510 persists a plurality of known IDs for a node array(s). In another embodiment, and as illustrated in FIG. 1, the data store of known IDs resides at a remote location within an ID management system 124 (FIG. 1). The computer processor 504 may comprise one more microprocessors, co-processors, or the like, and is in communication with network interface (NIC) 508 to communicate data via communications network 130 (FIG. 1) with ID management system 124 (FIG. 1).

The NIC 508 may be configured to operate with a plurality of communication channels for simultaneous communication with other processors, servers, etc. The network interface 508 may include one or more network interface cards or a network controller. In some embodiments, the network interface 508 may include a personal area network (PAN) interface. The PAN interface may provide the capability for the electronic reader 122 to network using a short-range communication protocol, for example, a Bluetooth communication protocol. The PAN interface enables the electronic reader 122 to connect wirelessly to another device via a peer-to-peer connection. The NIC 508 can also provide an interface to a wireless local area network (LAN), such as a Wi-Fi network or any wide area network (WAN), such as a cellular mobile communications network. The WAN interface has communications circuitry including antenna 503 coupled to a radio circuit with transceiver 502 for transmitting and receiving radio signals via the antenna. Antenna 503 is shown generically; the electronic reader can be provided with multiple antennas, including an antenna for interrogating the nodes in the array(s) and an antenna for coupling to the communications network 130. The radio circuit can be configured to operate in a mobile communications network, including but not limited to global systems for mobile communications (GSM), code division multiple access (CDMA), wideband CDMA (WCDMA), time division multiple access (TDMA) and the like, as are conventionally known in the art of telecommunications.

The electronic reader 122 further includes a transceiver 506 that is coupled to an antenna 507 for interrogating the nodes in the array(s). In accordance with an embodiment of the disclosure, a 6 Mhz antenna and transceiver operating at greater than or equal to 50 Watts could be utilized. Although optimally configured for interrogating the nodes over a longer distance, electronic reader 122 may include a near field communication (NFC) interface, which can enable interrogation of the nodes over short distances at relatively low data rates (e.g., 424 kb/s). The NFC interface may take place via magnetic field induction, allowing the NFC interface to communicate with other NFC interfaces located on other devices 104 or to retrieve information from nodes having radio frequency identification circuitry.

The memory 505 includes computer program instructions comprising program code that is executed by computer processor 504 to direct the electronic reader to wirelessly interrogate, by the transceiver 502, an array of nodes 300 coupled to the wall, ceiling or floor covering (FIGS. 1 through 3). The return signals from the nodes in the array contain data representing IDs for corresponding responsive (undamaged) nodes in the array. The computer processor 504 then extracts the IDs in the return signals. In one embodiment, the received IDs are communicated via the communication network to the ID management system 124 where the received IDs are compared to a plurality of known IDs for the nodes in any given array stored in data store 126 in the ID management system 124. The data store is illustrated generically, and may consist of a distributed database system accessible in the "cloud." These types of databases are known in the art.

The data store 126 contains IDs for each node in any given array. In this manner, damage to a floor or wall covering associated with such an array may be detected when there is a mismatch between the returned and stored IDs for the nodes in the array. Inoperative nodes arising from a crack as shown in FIG. 1 indicate a structural defect(s) or physical damage in a respective portion of the dwelling covered by the floor or wall covering. It will be appreciated by those skilled in the art that truly "unique IDs" are not required, but only that there be relative confidence that the same ID is not often replicated in node arrays that are utilized in the same proximity. Thus, in a dwelling or dwellings having floor, ceiling and wall coverings that fall within the interrogation range of the electronic reader 122, the coverings should have associated arrays of nodes with IDs for each node in the arrays. To keep track of the IDs, any given roll of wall, ceiling or floor covering can advantageously be provided with an identifier that is mapped to an array(s) of nodes associated with that roll. It will also be appreciated, that the array of nodes may be advantageously disposed and embedded within a particular structure itself of a dwelling, such as, for example, embedded in a particular wall or floor, drywall (sheetrock), load bearing column or beam, or in specific locations proximate to defined areas of load bearing elements where damage may be expected in the case of a natural or man-made disaster. In these expedients, the particular structure is provided with an identifier that is mapped to the array(s) of nodes coupled to those elements.

In another embodiment, the IDs may persist in local storage within data store 510. In such an expedient, the electronic reader 122 directly compares the extracted IDs to the locally stored IDs to determine whether there is any mismatch. The known IDs can be downloaded to the electronic reader 122 from the ID management system 124 via the communications network 130, or loaded into the electronic reader from memory media via a pluggable interface (not shown). Upon determining a mismatch after extracting the node IDs received responsive to the interrogation, an indication of damage can be communicated to an operator via a graphical user interface (UI) on a display 512. Alternatively, such indication of damage can be transmitted to a remote device or server via communications network 130 using known communication protocols.

In accordance with embodiments of the present disclosure, the presence of defects or damage to structure is indicated a mismatch is observed between the returned IDs and known IDs for each node in the array. This can arise from either a break in the antenna loop, or damage to the IC itself. Since the array of nodes are physically coupled to the underlying structure such as a floor or wall, a node(s) in the array may be rendered inoperable when such underlying structure moves, breaks or cracks, thereby potentially causing the attached covering to stretch and break the corresponding antenna loop or IC. Where a relatively small antenna loop that operates at higher frequency is utilized in lieu of the configuration described above (with associated shorter interrogation range), a portion of the IC may provide a damage detection feature by connecting the sequence generator 406 and modulator 410 (FIG. 4) by a loop having a 1 m radius. In this respect, underlying structural damage may cause a break in the connection and thus cause the node to fail to transmit its ID. Likewise, such an extended connection can be made between the RF energy harvester 402 and the sequence generator 406. Any break in the connection will cause the affected node to fail to transmit its ID in response to the interrogation, and thereby indicate a mismatch and underlying structural damage to the affected portion of the dwelling structure.

In accordance with yet another embodiment of the present disclosure, a damage detection feature may be provided in the sequence generator. Advantageously, the circuit can be configured with the sequence generator 406 to generate a "damage not present" bit. If, for example, the return signal received by the electronic reader contains a bit having a particular or specified value and length, then this is indicative of no damage present. Likewise, if the return signal contains a bit value of a different value and length, then such indication would signify the presence of structural damage. In this connection, commonly known types of forward error correction (FEC) and detection can be employed to ensure reliability of the "damage not present" bit.

Figure 6:
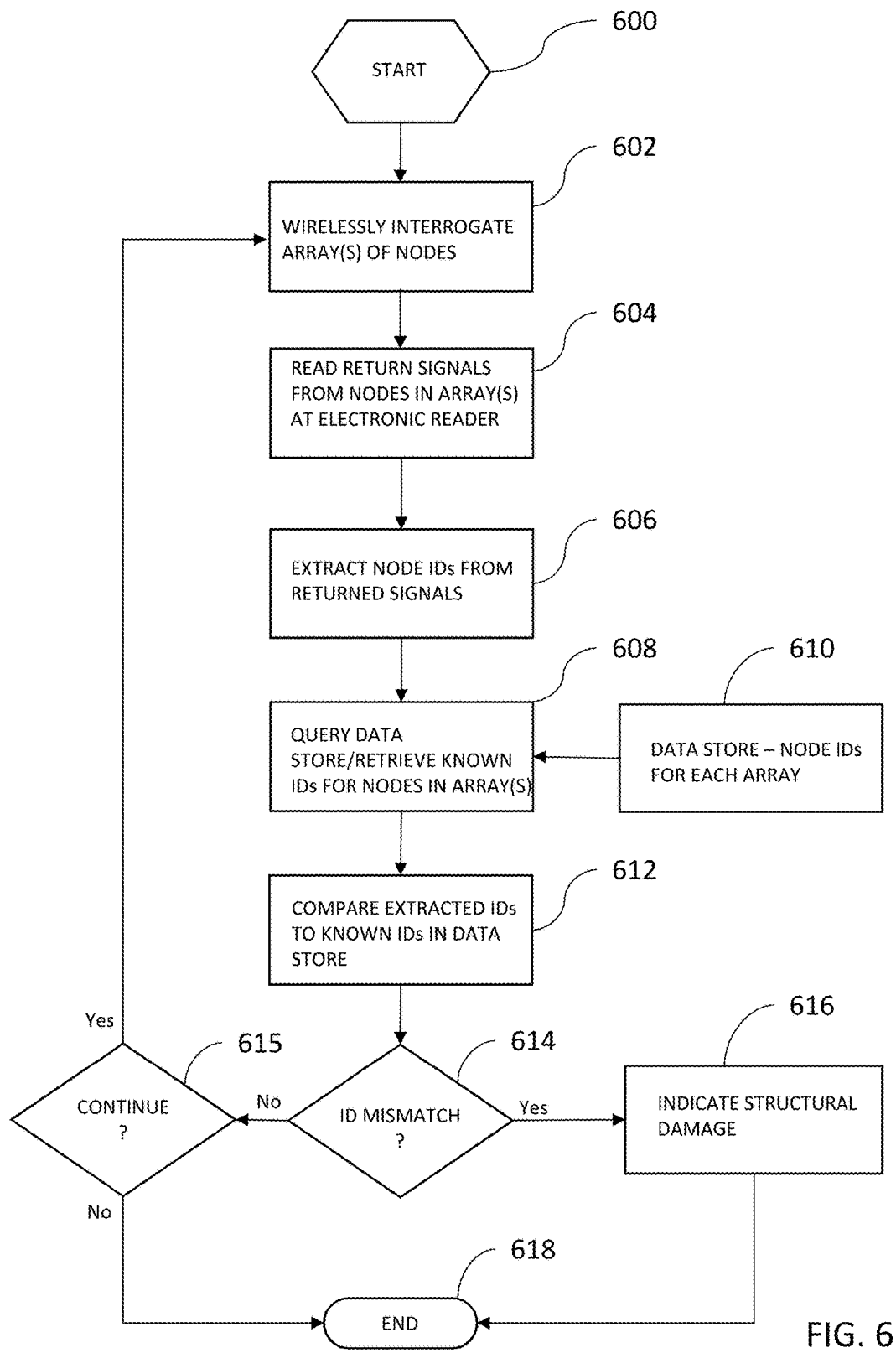
FIG. 6 is a flow diagram of a method in accordance with an embodiment of the present disclosure.

Referring now to FIG. 6 there is depicted a flow diagram of a method for detecting damage to a structure in accordance with an embodiment of the present disclosure. The method is initiated at block 600. In block 602, a wireless reader wirelessly interrogates an array of nodes coupled to a wall or floor covering of at least a portion of the structure. In block 604, the electronic reader receives and reads return signals containing data representing IDs for corresponding responsive nodes in the array. In block 606, the returned IDs are extracted from the return signals. In block 608 the known IDs are queried and retrieved from the data store 610. In block 612, the extracted IDs are compared to the plurality of known IDs for corresponding nodes in the array. In block 614, if a mismatch is detected between the returned and stored IDs for nodes in the array, then a potential structural defect may be indicated in a respective portion of the structure in block 616. The process proceeds to block 615, where if there a decision to continue interrogating additional nodes, the process loops back to block 602. If not, the process ends at block 618.

The terms "program," "software application," and the like, as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

The present disclosure may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Embodiments of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Some portions of the detailed descriptions, like the processes may be presented in terms of algorithms and symbolic representations of operations on data bits within a computer memory. An algorithm may be generally conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk, read-only memories (ROMs), random access memories (RAMs), EPROMs, EEPROMs, magnetic or optical cards, or any type of media suitable for storing electronic instructions. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on one computer, partly on the computer, as a stand-alone software package, partly on the first computer and partly on a remote computer or entirely on the remote computer or server. In the latter scenario, the remote computer may be connected to the first computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry to perform embodiments of the present disclosure.

Accordingly, embodiments and features of the present disclosure are set out in the following in the following numbered items:

1. A method of detecting defects in a structure, comprising:
wirelessly interrogating, by an electronic reader, an array of nodes coupled to a surface covering of at least a portion of the structure; reading, by the electronic reader, return signals containing data representing IDs for corresponding responsive nodes in the array; and comparing the returned IDs to a plurality of IDs stored in a data store for corresponding nodes in the array, where a mismatch between the returned and stored IDs for nodes in the array indicates a structural defect in a respective portion of the structure covered by the surface covering.

2. The method of item 1, where the surface covering is at least one of a wall, ceiling and floor covering.

3. The method of item 1, where the array of nodes comprises a plurality of loop antennas resonant at a specified frequency.

4. The method of item 3, further comprising modulating the impedance of at least one of the loop antennas in response to the interrogation.

5. The method of item 4, where at least one damaged antenna in the array of loop antennas fails to return its ID in response to the interrogation.

6. The method of item 1, further comprising the antenna array residing on a thin-film substrate physically coupled to the surface covering.

7. The method of item 3, where a broken connection between a sequence generator and modulator in an IC coupled to a corresponding loop antenna causes the corresponding loop antenna to fail to return a signal comprising a corresponding ID.

8. The method of item 3, where a sequence generator transmits a signal to a modulator in an IC, indicative of no damage.

9. An electronic reader for wirelessly detecting defects in a structure, comprising: a transmitter operable to generate interrogation signals; a receiver operable to receive return signals; and at least one processor coupled to a non-transitory memory storing computer program instructions that when executed by the at least one processor, cause the electronic reader to: wirelessly interrogate, by the transmitter, an array of nodes coupled to surface covering of at least a portion of the structure; read return signals, received by the receiver, containing data representing IDs for corresponding responsive nodes in the array; and extract the IDs in the return signals and compare the IDs to a plurality of IDs stored in a data store for corresponding nodes in the array, where a mismatch between the returned and stored IDs for the nodes in the array indicates a structural defect in a respective portion of the structure covered by the surface covering.

10. The electronic reader of item 9, where the surface covering is at least one of a wall, ceiling and floor covering.

11. The electronic reader of item 9, where the data store contains a plurality of IDs for corresponding nodes in each of a plurality of arrays covering portions of the structure.

12. The electronic reader of item 9, where the data store is remotely disposed from the electronic reader and the electronic reader communicates with the data store over a communications network.

13. A system for wirelessly detecting defects in a structure, comprising: at least one array having a plurality of nodes, the array coupled to a surface covering for a least a portion of the structure; and an electronic reader operable to wirelessly interrogate the at least one array and read return signals from nodes in the array, the return signals containing data representing an ID for corresponding responsive nodes in the array, the electronic reader further operable to compare the returned IDs to a plurality of IDs stored in a data store for corresponding nodes in the array, where a mismatch between the returned and stored IDs for the nodes in the array indicates a structural defect in a respective portion of the structure covered by the surface covering.

14. The system of item 13, where the surface covering is at least one of a wall, ceiling and floor covering.

15. The system of item 13, where the array of nodes comprises a plurality of loop antennas resonant at a specified frequency.

16. The system of item 15, where the impedance of at least one of the loop antennas is modulated in response to the interrogation.

17. The system of item 16, where at least one damaged antenna in the array of loop antennas fails to return its ID in response to the interrogation.

18. The system of item 13, where the at least one antenna array resides on a thin-film sheet, the thin-film sheet physically coupled to the surface covering.

19. The system of item 15, where a broken connection between a sequence generator and modulator in an IC coupled to a corresponding loop antenna causes the corresponding loop antenna to fail to return a signal comprising a corresponding ID.

21. The system of item 15, where a sequence generator transmits a signal to a modulator in an IC, indicative of no damage.

22. A covering for at least one of a floor, ceiling and wall of a structure, comprising: an array of nodes, each node in the array having an ID associated therewith, the nodes configured to return signals containing data representing an ID for corresponding nodes in the array in response to wireless interrogation by an electronic reader.

23. The covering of item 22, where the array of nodes comprises a plurality of loop antennas resonant at a specified frequency.

24. The covering of item 23, where the impedance of at least one of the loop antennas is modulated in response to the interrogation.

25. The covering of item 23, further comprising a sequence generator and modulator in an IC coupled to each antenna, and where a broken connection between the sequence generator and modulator causes the corresponding loop antenna to fail to return a signal comprising a corresponding ID.

26. The covering of item 25, where the sequence generator and modulator in the IC are coupled by a loop passing through a region of the structure in which defects are to be detected.

27. The covering of item 23, further comprising a sequence generator that transmits a signal to a modulator in an IC, indicative of no damage.

28. The covering of item 22, where the array of nodes is printed on a thin-film substrate.

29. The covering of item 22, where the array of nodes is roll-to-roll printed on at least one of the wall and floor covering.

30. A system for wirelessly detecting defects in a structure, comprising: at least one array having a plurality of nodes, the array embedded in at least a portion of the structure; and an electronic reader operable to wirelessly interrogate the at least one array and read return signals from nodes in the array, the return signals containing data representing an ID for corresponding responsive nodes in the array, the electronic reader further operable to compare the returned IDs to a plurality of IDs stored in a data store for corresponding nodes in the array, where a mismatch between the returned and stored IDs for the nodes in the array indicates a structural defect in a respective portion of the structure containing the embedded array.

31. The system of item 30, where the array of nodes comprises a plurality of loop antennas resonant at a specified frequency.

32. The system of item 31, where the impedance of at least one of the loop antennas is modulated in response to the interrogation.

33. The system of item 32, where at least one damaged antenna in the array of loop antennas fails to return its ID in response to the interrogation.

34. The system of item 31, where a broken connection between a sequence generator and modulator in an IC coupled to a corresponding loop antenna causes the corresponding loop antenna to fail to return a signal comprising a corresponding ID.

35. The system of item 31, where a sequence generator transmits a signal to a modulator in an IC, indicative of no damage.

In accordance with the foregoing, a novel method, system and wall/floor covering for indicating structural damage to underlying dwelling structure has been disclosed. Having thus described the invention of the present application in detail and by reference to embodiments thereof, it will be apparent that modifications and variations are possible without departing from the scope of the invention defined in the appended claims as follows:

We claim:

1. A method of detecting defects in a structure, comprising:
wirelessly interrogating, by an electronic reader, an array of nodes coupled to a surface covering of at least a portion of the structure; reading, by the electronic reader, return signals containing data representing digital IDs for corresponding responsive nodes in the array; and comparing the returned IDs to a plurality of IDs stored in a data store for corresponding nodes in the array, where a mismatch between the returned and stored IDs for nodes in the array indicates a structural defect in a respective portion of the structure covered by the surface covering.

2. The method of claim 1, where the surface covering is at least one of a wall, ceiling and floor covering.

3. The method of claim 1, where the array of nodes comprises a plurality of loop antennas resonant at a specified frequency.

4. The method of claim 3, further comprising modulating the impedance of at least one of the loop antennas in response to the interrogation.

5. The method of claim 4, where at least one damaged antenna in the array of loop antennas fails to return its ID in response to the interrogation.

6. The method of claim 1, further comprising the antenna array residing on a thin-film substrate physically coupled to the surface covering.

7. The method of claim 3, where a broken connection between a sequence generator and modulator in an IC coupled to a corresponding loop antenna causes the corresponding loop antenna to fail to return a signal comprising a corresponding ID.

8. The method of claim 3, where a sequence generator transmits a signal to a modulator in an IC, indicative of no damage.

9. An electronic reader for wirelessly detecting defects in a structure, comprising:

a transmitter operable to generate interrogation signals; a receiver operable to receive return signals; and at least one processor coupled to a non-transitory memory storing computer program instructions that when executed by the at least one processor, cause the electronic reader to:

wirelessly interrogate, by the transmitter, an array of nodes coupled to surface covering of at least a portion of the structure; read return signals, received by the receiver, containing data representing digital IDs for corresponding responsive nodes in the array; and extract the IDs in the return signals and compare the IDs to a plurality of IDs stored in a data store for corresponding nodes in the array, where a mismatch between the returned and stored IDs for the nodes in the array indicates a structural defect in a respective portion of the structure covered by the surface covering.

10. The electronic reader of claim 9, where the surface covering is at least one of a wall, ceiling and floor covering.

11. The electronic reader of claim 9, where the data store contains a plurality of IDs for corresponding nodes in each of a plurality of arrays covering portions of the structure.

12. The electronic reader of claim 9, where the data store is remotely disposed from the electronic reader and the electronic reader communicates with the data store over a communications network.

13. A system for wirelessly detecting defects in a structure, comprising:

at least one array having a plurality of nodes, the array coupled to a surface covering for a least a portion of the structure; and an electronic reader operable to wirelessly interrogate the at least one array and read return signals from nodes in the array, the return signals containing data representing digital IDs for corresponding responsive nodes in the array, the electronic reader further operable to compare the returned IDs to a plurality of IDs stored in a data store for corresponding nodes in the array, where a mismatch between the returned and stored IDs for the nodes in the array indicates a structural defect in a respective portion of the structure covered by the surface covering.

14. The system of claim 13, where the surface covering is at least one of a wall, ceiling and floor covering.

15. The system of claim 13, where the array of nodes comprises a plurality of loop antennas resonant at a specified frequency.

16. The system of claim 15, where the impedance of at least one of the loop antennas is modulated in response to the interrogation.

17. The system of claim 16, where at least one damaged antenna in the array of loop antennas fails to return its ID in response to the interrogation.

18. The system of claim 13, where the at least one antenna array resides on a thin-film sheet, the thin-film sheet physically coupled to the surface covering.

19. The system of claim 15, where a broken connection between a sequence generator and modulator in an IC coupled to a corresponding loop antenna causes the corresponding loop antenna to fail to return a signal comprising a corresponding ID.

20. The system of claim 15, where a sequence generator transmits a signal to a modulator in an IC, indicative of no damage.

* * * * *